United States Patent
Wang

(10) Patent No.: US 10,799,022 B2
(45) Date of Patent: Oct. 13, 2020

(54) CONNECTING STRUCTURE, CONNECTING METHOD AND ARTICLE CONTAINING SUCH CONNECTING STRUCTURE

(71) Applicants: HANGZHOU GREAT STAR INDUSTRIAL CO., LTD., Hangzhou, Zhejiang Province (CN); HANGZHOU GREAT STAR TOOLS CO., LTD., Hangzhou, Zhejiang Province (CN)

(72) Inventor: Weiyi Wang, Hangzhou (CN)

(73) Assignees: Hangzhou Great Star Industrial Co., Ltd., Hangzhou, Zhejiang Province (CN); Hangzhou Great Star Tools Co., Ltd., Hangzhou (CN)

(*) Notice: Subject to any disclaimer, the term of this patent is extended or adjusted under 35 U.S.C. 154(b) by 247 days.

(21) Appl. No.: 15/615,374

(22) Filed: Jun. 6, 2017

(65) Prior Publication Data

US 2017/0347793 A1 Dec. 7, 2017

Related U.S. Application Data

(63) Continuation-in-part of application No. 15/527,847, filed as application No. PCT/CN2015/076657 on Apr. 15, 2015.

(30) Foreign Application Priority Data

Nov. 19, 2014 (CN) .................... 2014 2 0691679 U

(51) Int. Cl.
*F16B 12/30* (2006.01)
*F16B 12/34* (2006.01)
(Continued)

(52) U.S. Cl.
CPC ............ *A47B 47/03* (2013.01); *A47B 47/025* (2013.01); *A47B 57/18* (2013.01); *A47B 57/22* (2013.01);
(Continued)

(58) Field of Classification Search
CPC . A47B 47/006; A47B 47/0075; A47B 47/025; A47B 57/48; A47B 57/50;
(Continued)

(56) References Cited

U.S. PATENT DOCUMENTS 2,058,263 A * 10/1936 Rosendale ............... H02B 1/30
312/265.4
2,169,182 A * 8/1939 Kost ....................... F16B 37/02
411/437
(Continued)

FOREIGN PATENT DOCUMENTS

| CN | 101265931 A | 9/2008 |
| CN | 201468493 U | 5/2010 |

(Continued)

OTHER PUBLICATIONS

International Search Report dated Aug. 24, 2015 from corresponding International Application No. PCT/CN2015/076657, 8 pages.
(Continued)

*Primary Examiner* — Michael P Ferguson
(74) *Attorney, Agent, or Firm* — Ohlandt, Greeley, Ruggiero & Perle, L.L.P.

(57) ABSTRACT

The present invention discloses a connecting structure, a connecting method and an article containing the connecting structure. The connecting structure includes a fastener, a first connecting member adjacent to the trailing end of the fastener and a second connecting member away from the trailing end of the fastener. The second connecting member is provided with a threaded connecting hole, which in the axial direction thereof is provided with thread matching with the form of thread of the fastener and having a central angle of at least 180 degrees. The first connecting member is provided with a connecting hole, and the fastener connects the two connecting members through the threaded connecting hole and the connecting hole. The connecting method
(Continued)

achieves quick connecting with the connecting hole of the first connecting member by preloading the fastener to the threaded connecting hole, without being affected by the assembly space. The connecting structure and the connecting method can be used in a variety of articles. The thickness of the threaded connecting hole is equal to the pitch of the fastener. The form of thread of the threaded connecting hole is fitted with the thread of the fastener by only one turn, which during processing can be made directly in the form of stamping, resulting in a simple processing and improving the processing efficiency.

4 Claims, 9 Drawing Sheets

(51) Int. Cl.
  *A47B 47/03*  (2006.01)
  *A47B 57/26*  (2006.01)
  *A47B 57/40*  (2006.01)
  *A47B 57/18*  (2006.01)
  *A47B 57/22*  (2006.01)
  *A47B 47/02*  (2006.01)
  *A47B 57/44*  (2006.01)

(52) U.S. Cl.
  CPC .......... *A47B 57/265* (2013.01); *A47B 57/402* (2013.01); *F16B 12/34* (2013.01); *A47B 57/44* (2013.01)

(58) Field of Classification Search
  CPC ... A47B 96/20; A47B 96/201; A47B 47/0066; F16B 5/02; F16B 5/06; F16B 12/10; F16B 12/28; F16B 12/30; F16B 12/32; F16B 12/34; F16B 2012/106
  See application file for complete search history.

(56) References Cited

U.S. PATENT DOCUMENTS

| | | | | |
|---|---|---|---|---|
| 2,264,243 | A * | 11/1941 | Knuth | ............... F16B 12/34 411/418 |
| 3,029,056 | A | 4/1962 | Breglia | |
| 3,124,402 | A | 3/1964 | Rhoads | |
| 3,362,278 | A * | 1/1968 | Munse | ............... F16B 37/02 411/437 |
| 3,523,612 | A | 8/1970 | Hall | |
| 3,693,556 | A | 9/1972 | Rous | |
| 3,862,691 | A | 1/1975 | Mori et al. | |
| 4,285,436 | A | 8/1981 | Konstant et al. | |
| 5,921,643 | A * | 7/1999 | Louth | ............... A47B 47/02 312/111 |
| 6,123,400 | A * | 9/2000 | Nicolai | ............... H02B 1/301 211/189 |
| 6,908,274 | B1 * | 6/2005 | Vassiliou | ............... F16B 37/02 411/173 |
| 7,191,908 | B2 | 3/2007 | De Rijk | |
| 7,252,202 | B2 * | 8/2007 | Saltzberg | ............... A47B 57/50 211/187 |
| 9,101,216 | B2 | 8/2015 | Fitzgerald et al. | |
| 9,301,610 | B1 | 4/2016 | Berry | |
| 9,474,369 | B1 | 10/2016 | Tsai | |
| 9,661,921 | B1 | 5/2017 | Tsai | |
| 2005/0103733 | A1 | 5/2005 | Saltzberg et al. | |
| 2005/0103734 | A1 | 5/2005 | Saltzberg et al. | |
| 2010/0084354 | A1 | 4/2010 | Eustace | |
| 2011/0272373 | A1 | 11/2011 | Wojtowicz et al. | |
| 2011/0272541 | A1 | 11/2011 | Wojtowicz et al. | |
| 2011/0272542 | A1 | 11/2011 | Wojtowicz et al. | |
| 2012/0000872 | A1 | 1/2012 | Troyner et al. | |
| 2012/0000873 | A1 | 1/2012 | Fitzgerald et al. | |
| 2014/0217252 | A1 | 8/2014 | Fitzgerald et al. | |
| 2015/0282613 | A1 | 10/2015 | Chen | |

FOREIGN PATENT DOCUMENTS

| | | | |
|---|---|---|---|
| CN | 102949019 A | 3/2013 | |
| CN | 203880344 U | 10/2014 | |
| DE | 148180 A1 | 5/1981 | |
| GB | 449681 | 7/1936 | |
| GB | 1080997 | * 8/1967 | ............. A47B 57/00 |

OTHER PUBLICATIONS

Written Opinion dated Aug. 24, 2015 from corresponding International Application No. PCT/CN2015/076657, 4 pages.

* cited by examiner

CONNECTING STRUCTURE, CONNECTING METHOD AND ARTICLE CONTAINING SUCH CONNECTING STRUCTURE

FIELD OF THE INVENTION

The present invention relates to a connecting structure, a connecting method and an article containing the connecting structure.

DESCRIPTION OF THE PRIOR ART

There is a number of types of existing connecting structures which are widely used in a variety of occasions. After years of technical evolution, weld connections, threaded connections and rivet connections in steel connecting structures are the most commonly used connecting structures. These three connecting structures can be universally interchangeably used, but specific connecting structures may be required to be used in certain occasions, for example, weld connections are used for fixed non-removable connections, threaded connections are used for repeatable detachable connections, and rivet connections are used for destructive detachable connections.

Threaded connections are further divided into bolted connections and screw connections, where in a bolted connection the hole provided in the connecting member is an unthreaded hole, then a nut is used for fixation, and in a screw connection the hole provided in the connecting member is a threaded hole, then a screw is screwed into the threaded hole for fixation. Comparing with the bolted connections, a nut is saved in screw connections, without occurrence of rotation of the bolt along with the nut during screwing, and fewer accessories are carried during assembly, thus providing a faster speed in screw connections in comparison to the bolted connections.

For using a screw connection during assembly, the connecting holes of the two connecting members are required to be coinciding first, and then the screw is screwed into the connecting holes, where the connecting hole in the connecting member facing the tip of the screw is required to be provided as a threaded hole. The structure of the screw defines the tools used is a screwdriver, and the axis of the screwdriver and the axis of the screw coincide. During assembly, the two connecting members coincide, the connecting holes are aligned to coincide, the tip of the screw is inserted into the connecting holes, and then the end of the screwdriver is pointed to the trailing end of the screw, such that sufficient space is required to be left for the part for mounting the screw to facilitate positioning the screwdriver as well as to facilitate the operation of rotating the screwdriver by hand. However, insufficient space is left, affected by the structure, and the screw connection is limited.

Chinese Patent Office announced a patent No. CN101265931B on Jul. 21, 2010, entitled a hidden connection device between two pipe members, in which the hidden connection device includes: a first pipe member, which has one or more threaded holes for threaded fastening with screws; a second pipe member provided with one or more screws slide slots, the screw slide slots are provided with a through hole at one end thereof for insertion of a screw head, the remainder of the screw slide slots is a slide slot for sliding of the neck of the screw, and the width of the slide slot is smaller than the diameter of the screw head and larger than the diameter of the neck of the screw; the screw includes a screw head, a screw neck, a locating piece and a thread part; during assembly, the screw thread of the screw is fastened to the threaded hole and is located and fixed by the locating piece. The screw head of the screw passes through the through hole of the screw slide slot of the second pipe member and then passes through the screw neck and slides to be located through the slide slot of the screw slide slot. But the pipe member 1 is to be provided with a threaded hole, and the threaded hole will be formed to be multi-threaded, with at least 2 threads, so tapping is required to complete the processing, making it time-consuming, and the threads are easily to be affected by plate thickness. If the thickness of the plate is greater than the pitch, multiple threads will be produced on the plate, requiring high precision of the thread so as to tighten the screw, and if the plate thickness is less than or equal to the pitch, one cannot process a complete one turn of thread, affecting the strength of the screw fastening. Moreover, with the increase of the number of turns of threads, the processing time on the plate is increased, which reduces the processing efficiency.

In addition, in the factory's processing workshop, the storage racks are tools for storing parts, so there are usually multiple storage racks placed in the workshop.

Most of the storage racks are multi-storeyed, with each storey provided with a shelf plate placed on a beam, therefore each storage rack has a plurality of beams, so that a workshop requires a large number of beams for all the storage racks.

The cost of the storage racks will rise because of the increasing number of beams. In order to reduce the cost, the structure of the beam will be simplified, which will easily lead to a reduced strength, allowing reduced weight the beam is able to support, so that the number of element that can be stored on the storage rack is reduced.

With the existing storage racks, the columns and beams are mostly bolt connected, the assembly and disassembly are more troublesome with this connection, requiring more time, and if the number of shelves of the storage rack is to be increased, the efficiency will be lowered.

Accordingly, those skilled in the art are committed to developing a storage rack structure that is easy to assemble and disassemble with reduced cost but not reduced strength.

SUMMARY OF THE INVENTION

In order to improve processing efficiency of the connecting structure and therefore simplifying the structure and achieving quick connection, the invention provides a connecting structure and a connecting method therefore. The technical scheme is specifically as follows: a connecting structure, comprising a fastener, a first connecting member adjacent to the trailing end of the fastener and a second connecting member away from the trailing end of the fastener, wherein the second connecting member is provided with a threaded connecting hole, and the threaded connecting hole in the axial direction thereof is provided with thread matching with the form of thread of the fastener and having a central angle of at least 180 degrees; the first connecting member is provided with a connecting hole; the fastener connects the two connecting members through the threaded connecting hole and the connecting hole.

Further, the center angle of the thread in the axial direction of the threaded connecting hole is at most 360 degrees; the thickness of the threaded connecting hole is equal to one pitch of the fastener.

Further, the connecting hole is a combined connecting hole, comprising an insertion hole and a slide slot communicating with the insertion hole, the diameter of the insertion hole being greater than the diameter of the trailing end of the fastener, the width of the slide slot being adapted to be fitted with the diameter of the threaded segment of the fastener.

In a preferred embodiment, the edge of the threaded connecting hole is provided with an open slot in the radial direction, and both sides of the open slot are offset from each other to form a height difference of one pitch, the position of the open slot corresponding exactly to the start and end positions of the thread of the threaded connecting hole.

In another preferred embodiment, the edge of the threaded connecting hole is provided with an axial connecting portion in the radial direction, the axial connecting portion forming a height difference of one pitch at the periphery of the threaded connecting hole, the side edge of the axial connecting portion facing the center of the threaded connecting hole provided with a groove matching with the form of the thread of the fastener.

Further, the second connecting member is provided with a convex surface in the direction away from the first connecting member, and the threaded connecting hole is provided in the convex surface so that the convex surface is separated from the first connecting member when the second connecting member is overlapped and fastened with the first connecting member.

The invention also provides a connecting method for the above-mentioned connecting structure, including the following steps:

step 1, preparing fasteners for fastening and connecting according to the thickness of the plate of the second connecting member, where the pitch of the fastener is equal to the thickness of the plate of the second connecting member;

step 2, making an insertion hole having a diameter larger than the diameter of the trailing end of the fastener in the first connecting member, then making a slide slot that is communicated with the insertion hole and has a width adapted to be fitted with the diameter of the fastener threaded segment, where the location of the end of the slide slot corresponds to the final fastened position of the two connecting members, a convex surface is provided on the second connecting member, a threaded connecting hole is provided in the convex surface, the shape of the threaded connecting hole matches with the fastener thread shape of the fastener, and an open slot is provided at the junction of the start position and the end position of the thread of the threaded connecting hole;

step 3, pre-fastening the fastener into the threaded connecting hole in the second connecting member, the convex surface of the second connecting member being funnel-shaped, where the fastener is screwed in from the large diameter end of the convex surface of the second connecting member to control the distance between the inner side plane of the trailing end of the fastener and the surface of the second connecting member to be the thickness of the first connecting member;

step 4, aligning the insertion hole of the first connecting member with the trailing end of the fastener, and passing the trailing end of the fastener through the insertion hole to allow overlapping of the first connecting member and the second connecting member with each other, and then moving the first connecting member in the direction along the slide slot so that the fastener clamps tight the first connecting member and the second connecting member.

Preferably, the convex surface, the threaded connecting hole and/or the open slot thereon are processed by punching.

Further, steps 3 and 4 are repeated when there is a plurality of connections between the first connecting member and the second connecting member, to complete all the connections.

The invention also provides an article containing the connecting structure as above-mentioned.

Further, the connecting method as above-mentioned is used for connecting.

Further, the article is a cabinet, a box, a drawer, a table, a stool, a chair, or a rack. Preferably, the cabinet is an iron cabinet, a wooden cabinet or a plastic cabinet; the rack is a storage rack or a bookrack.

Further, the same connecting member of the article is provided with the threaded connecting hole and the combined connecting hole, and the threaded connecting hole and the combined connecting hole of the same connecting member are staggered.

In a preferred embodiment, the article is a cabinet comprising a cabinet body and a cabinet door which are hinged to each other and the cabinet body is formed by a plurality of sub-assemblies that are connected to each other by the connecting structure.

Further, the edge position where the sub-assemblies are butted is provided with a flanging provided with a threaded connecting hole and/or a combined connecting hole formed by the insertion hole communicating with the slide slot; after two of the flangings are butted, the fastener connects the slide slot and the threaded connecting hole.

Further, the sub-assemblies comprise a back plate, side plates, a top plate and a bottom plate, four sides of the back plate each being provided with a flanging; a flap perpendicular to the side plate is formed at the vertical edge of the side plate, and the edge of the flap is provided with a flanging which is parallel to the side plate; a top flap perpendicular to the top plate is formed at the transverse edge of the top plate, the edge of the top flap being provided with the flanging, the flanging of the top flap being parallel to the top plate; a bottom flap perpendicular to the bottom plate is formed at the transverse edge of the bottom plate, the edge of the bottom flap being provided with the flanging, the flanging of the bottom flap being parallel to the bottom plate.

In another preferred embodiment, the article is a storage rack comprising columns and beams, the beams being provided with a first reinforcing rib extending along the longitudinal direction thereof, the first reinforcing rib having a support portion arranged for supporting a shelf plate. The beams are connected to the columns through the connecting members.

Preferably, the first reinforcing rib on the beam is located in the middle of the beam in the width direction thereof, so as to contribute to uniform force-bearing.

Preferably, the first reinforcing rib is punch out from the beam body, which is simple and fast in manufacturing.

Further, the first reinforcing rib is composed of an oblique portion and a transverse portion, the upper surface of the transverse portion is a support surface, and the shelf plate is placed on the support surface.

The specific structure of the preferred embodiment can be as follows: the transverse portion is flat plate shaped and the support surface is a supportive plane, which is the simplest structure in manufacturing; or the transverse portion is arc shaped and the support surface is a supportive cambered surface, which increases the support strength. Further, it can be a wave shaped support surface, producing multiple support contact line so as to increase the friction against the shelf plate.

The transverse portion is used for supporting the shelf plate, and the oblique portion is used as the support for the transverse portion. The oblique portion is flat plate shaped which is easy in manufacturing; or the oblique portion is arc shaped, allowing greater support strength. A rounded bending is adopted between the oblique portion and the transverse portion so as to make it hard to be broken.

In another preferred embodiment, the first reinforcing rib is composed of two oblique portions with different slopes and is upwardly tilted, a bent corner between the two oblique portions is a support corner; the advantage of such structure is that when bearing a heavy cargo, this structure is not prone to declination due to deformation in comparison with the structure with a transverse portion and the oblique portion.

Preferably, the angle between the upper oblique portion of the two oblique portions and the main plane of the beam is between 60 and 85 degrees.

Likewise, the two oblique portions can be flat plate shaped or arc shaped, and rounded bending is used between the two oblique portions.

Preferably, the distance between the support surface or support corner of the first reinforcing rib and the upper edge of the beam is adapted to be fitted with the thickness of the shelf plate.

Four beams are connected to the column to form one storey, so there may exist interference between the ends of the beams, and in order to avoid the interference, both ends of the first reinforcing rib are inclined ends.

Further, the first reinforcing rib is provided at the middle of the beam in the width direction thereof, the upper side edge of the beam is provided with a second reinforcing rib bent downward by 180 degrees at the same side of the first reinforcing rib; the lower side edge of the beam is a straight edge, or is provided with a third reinforcing rib bent by 90 degrees at the same side of the first reinforcing rib, or is further provided with a fourth reinforcing rib bent upward by 90 degrees near the edge on the basis of a third reinforcing rib bent by 90 degrees.

Further, the beam also has an arched rib at the same side as the first reinforcing rib along the longitudinal direction of the beam as a fifth reinforcing rib, not only aesthetically pleasing but also not prone to hurt hands during assembly and disassembly due to the round and smooth surface.

Further, two ends of the beam are also provided with connecting elements for connecting the column, and more than one connecting elements are provided at each end and respectively arranged at both sides of the first reinforcing rib along the width direction of the beam, so as to contribute to uniform force-bearing and the fastness.

In a preferred embodiment, the connecting element uses a rivet structure, and the rivet head and the first reinforcing rib are separately disposed on both sides of the main plane of the beam, a clearance being provided between the surface of the rivet head and the surface of the beam, the clearance being the thickness of the plate of the column. With the rivet as the connecting element, the connecting is facilitated, and in addition, a hook shaped structure can be used as the connecting element.

Further or in another embodiment, the connecting element uses the connecting structure, both ends of the beam are provided with the threaded connecting holes and/or the connecting holes, fitted with and connected to the corresponding connecting holes and/or the threaded connecting holes in the column by means of the fastener.

In a preferred embodiment, the column comprises two right-angled planes in which a plurality of snap holes are respectively provided, and the snap holes that are corresponding to each other are formed by a large circular hole and a small circular hole that communicate with each other, the beam snapped into the snap hole via a connecting element. The rivet is directly snapped into the snap hole, so as to facilitate assembly and disassembly.

In a preferred embodiment, the beam and the shelf plate are connected by using the above-mentioned connecting structure.

The invention solves the shortcomings of the existing fastener connection which is required to fasten the multi-thread thread on the connecting piece, the processing time is long and the processing efficiency is easy to be reduced, and the threaded connecting hole is formed on the connecting member, the edges thereof only forming a thread matching with the form of thread of the fastener, thus improving the processing efficiency.

The invention also solves the defects that the thickness of the existing connecting member does not correspond to the pitch of the fastener, and the connecting hole on the connecting member is prone to less than one thread to affect the fastening strength, and more than one thread causes processing trouble. When connecting, the pitch of the fastener according to the invention is equal to the thickness of the connecting member, the connecting hole having only one thread is machined on the connecting member, and the processing is convenient and the connection is convenient.

The invention also solves the problem that the existing fastener connection needs to use the screwdriver to be easily affected by the fastener assembly space, and the problem that the space is too small to be assembled. The connecting method of the invention adopts that the fastener is preliminarily connected to one of the connecting members, and the other connecting member is provided with an insertion hole and a slide slot, and is fastened in a way of inserting and sliding, without being influenced by the assembly space for the fastener.

The convex surface is designed so that when the fastener is threaded into the threaded connecting hole, the convex surface acts on the fastener in the direction of the small diameter end of the convex surface. The fastener also imparts a convex reaction force in the direction of the large diameter end. The design of the convex surface thus allows the fastener to tighten the connection of the second connecting member to the first connecting member.

The slotted or axially connected portion of the threaded connecting hole resolves that the thickness of the threaded connecting hole remains at one pitch but there is a problem of a height difference in one pitch of the edge of the threaded connecting hole.

The present invention relates to a storage rack using a connecting structure in which a beam is connected to a column by a connecting member. The connecting member may be the above-mentioned connecting structure or may be other connecting means. The first rib on the beam can improve the strength of the beam, while supporting the shelf plate, the structure is simple, but does not reduce the strength of the beam.

The concepts, the specific structures and the technical effects of the present invention are described further below in conjunction with the accompanying drawings, in order to fully understand the objects, features and effects of the present invention.

1 Fastener, 2 First connecting member, 3 Combined connecting hole, 4 Second connecting member, 5 Threaded connecting hole, 6 Convex surface, 7 Open slot, 8 Insertion hole, 9 Slide slot, 10 Cabinet door, 11 Top plate, 12 Back plate, 13 Side plate, 14 Flanging, 15 Bottom plate, 16 Flap, 21 Column, 22 Beam, 23 Shelf plate, 24 First reinforcing rib, 25 Inclined end, 26 Rivet, 27 Reinforcing rib, 28 Transverse part, 29 Oblique part, 30 Snap hole.

DETAILED DESCRIPTION OF THE PREFERRED EMBODIMENTS

The present invention will be described more fully hereinafter with reference to the accompanying drawings in combination with the preferred embodiments.

Example 1

Figure 1:
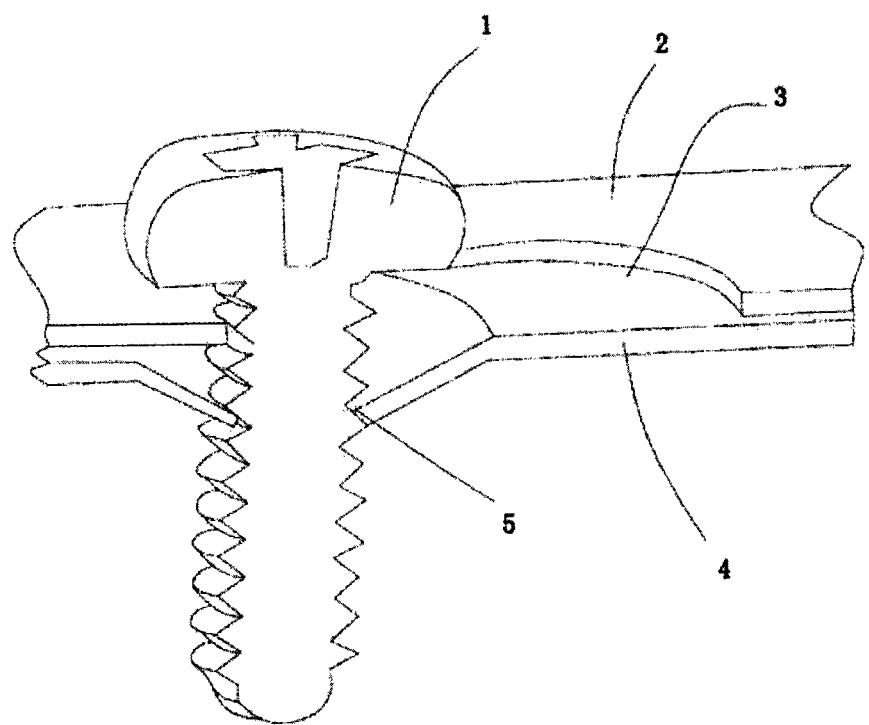
FIG. 1 is a cross-sectional view of a connecting structure according to the present invention.
Figure 2:
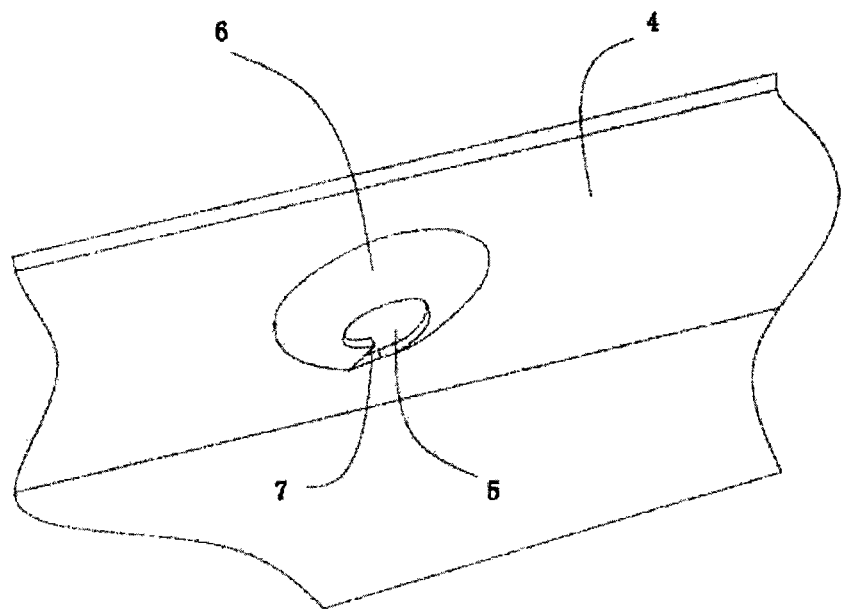
FIG. 2 is a structural schematic diagram of the structure of the threaded connecting hole according to the present invention.
Figure 3:
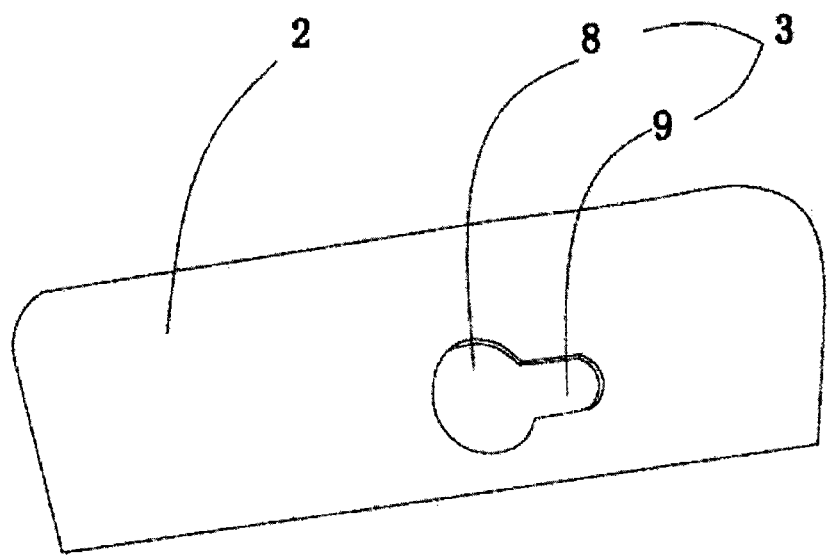
FIG. 3 is a structural schematic diagram of the structure of a combined connecting hole according to the present invention.

FIG. 1 shows a connecting structure in which a fastener 1 connects two connecting members. The fastener 1 is a screw. One of the two connecting members that is located near the screw cap (i.e., the trailing end of the fastener 1) is a first connecting member 2, and the one away from the screw cap is a second connecting member 4. The first connecting member is provided with a combined connecting hole 3, and the second connecting member is provided with a threaded connecting hole 5. The combined connecting hole 3 includes an insertion hole 8 and a slide slot 9 which communicate with each other. The diameter of insertion hole 8 is larger than the diameter of the screw cap, and the width of the slide slot 9 is adapted to be fitted with the diameter of the threaded segment of the screw (see FIG. 3). The edge of the threaded connecting hole 5 forms a convex surface 6, and when the second connecting member 4 is overlapped and fastened with the first connecting member 2, the convex surface 6 of the second connecting member 4 is separated from the first connecting member 2, and the screw is screwed in from the larger diameter end of the convex surface 6 of the second connecting member 4. The hole wall of the threaded connecting hole 5 is one complete turn of thread with a center angle of 360 degrees, the thread of which matches with the thread of the screw. The thickness of the threaded connecting hole 5 is equal to the pitch of the screw, and the edge of the threaded connecting hole 5 is provided with an open slot 7 in the radial direction (see FIG. 2), and both sides of the open slot 7 are offset from each other to form a height difference of one pitch. The position of the open slot 7 corresponds exactly to the start and end positions of the thread of the threaded connecting hole 5. When the screw fastens the first connecting member 2 and the second connecting member 4, the screw is in the slide slot 9 and the threaded connecting hole 5.

Figure 4:
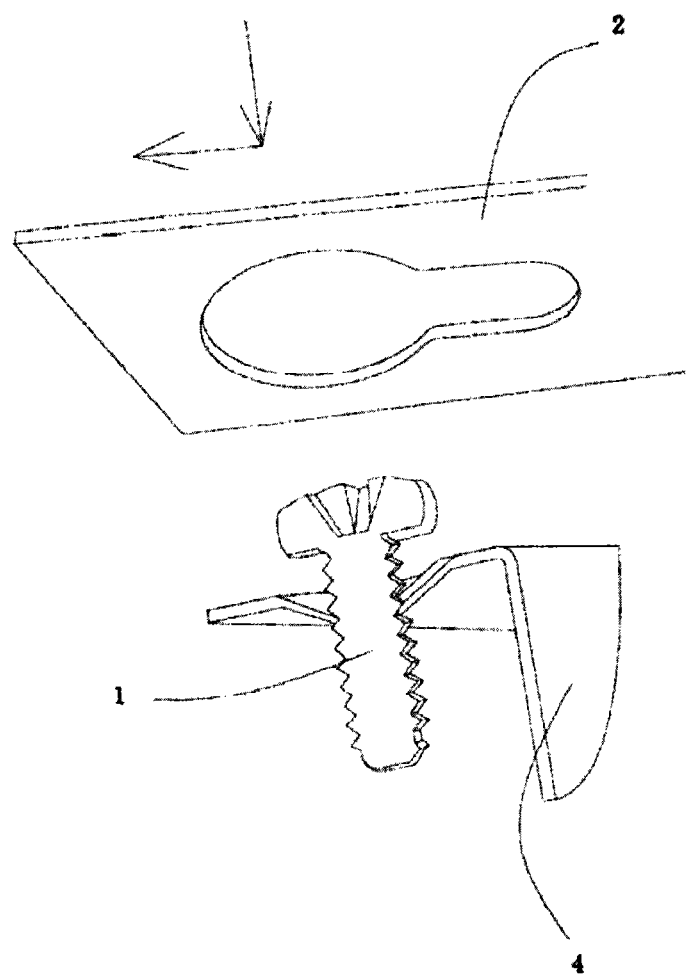
FIG. 4 is a schematic process diagram of the connecting method according to the present invention.

FIG. 4 shows the connecting method of the above-mentioned connecting structure:

Step (1), preparing screws for fastening and connecting according to the thickness of the plate of the connecting members, where the screw pitch is equal to the thickness of the plate;

Step (2), making an insertion hole 8 having a diameter larger than the diameter of the screw cap in the first connecting member 2, then making a slide slot 9 that is communicated with the insertion hole 8 and has a width adapted to be fitted with the diameter of the screw threaded segment, where the location of the end of the slide slot 9 corresponds to the final fastened position of the two connecting members, a convex surface 6 is punched out in the second connecting member 4, an open slot is punched out in the convex surface 6, and a threaded connecting hole 5 is punched out at the intermediate position of the convex surface 6. The shape of the threaded connecting hole 5 matches with the shape of one pitch screw thread of the screw, and the threaded connecting hole 5 forms a staggered distance from the pitch at the position of the slot 7;

Step (3), pre-screwing the screw into the threaded connecting hole 5 in the second connecting member 4, where the screw is screwed in from the large diameter end of the convex surface 6 of the second connecting member 4 to control the distance between the inner side plane of the screw cap and the surface of the second connecting member 4 to be the thickness of the first connecting member 2;

Step (4), next, aligning the insertion hole 8 of the first connecting member 2 with the screw cap, and passing the screw cap through the insertion hole 8 to let the first connecting member 2 and the second connecting member 4 overlap with each other, and then moving the first connecting member 2 in the direction along the slide slot 9 so that the screw clamps tightly the first connecting member 2 and the second connecting member 4.

Step (5), repeating the above Step (3) when there is a plurality of connections between the first connecting member 2 and the second connecting member 4, and then finally the step (4) is carried out and finally all the connections are completed.

Figure 5:
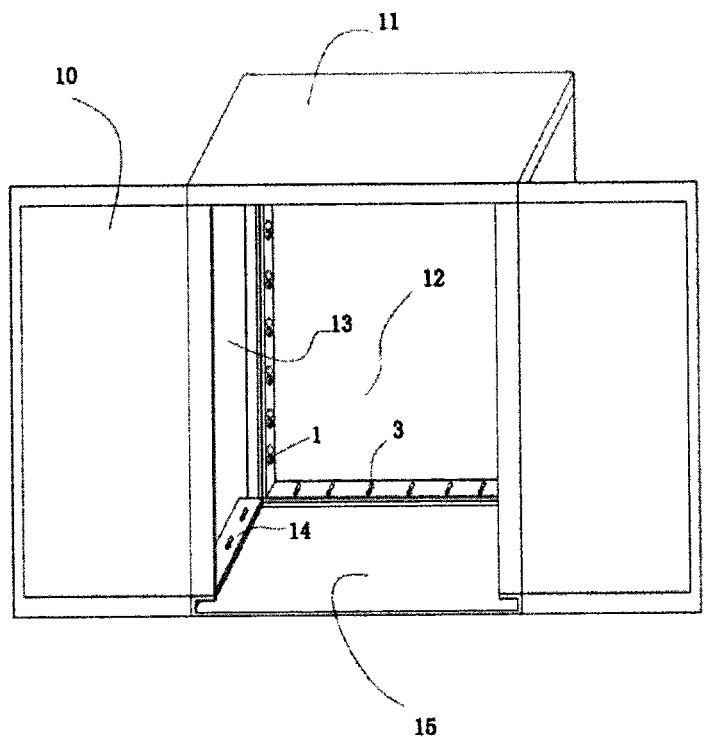
FIG. 5 is a structural schematic diagram of a cabinet containing the connecting structure according to the present invention.
Figure 6:
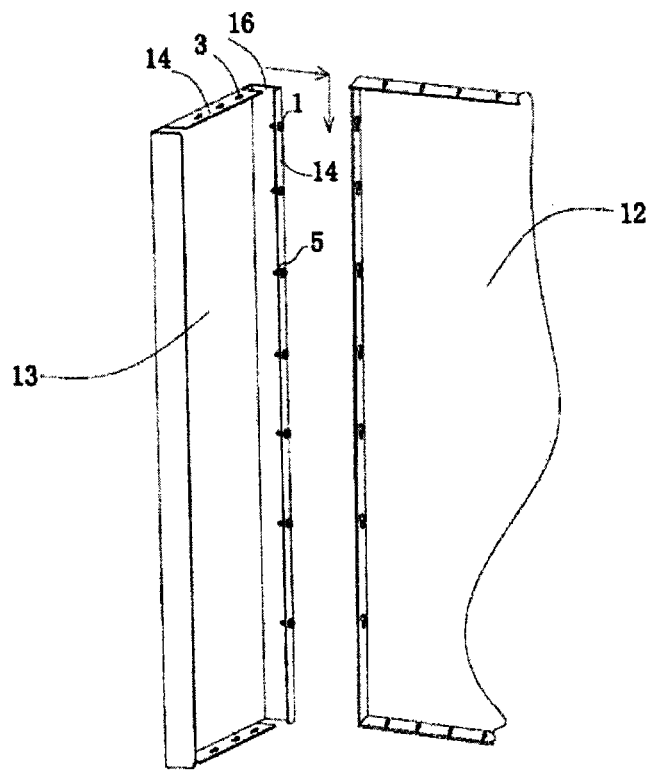
FIG. 6 is an assembled schematic diagram of a cabinet containing the connecting structure according to the invention.

FIG. 5 shows a cabinet using the above-mentioned connecting structure, including a cabinet body and a cabinet door 10 which are hinged to each other and the cabinet body is formed by a plurality of sub-assemblies that are connected to each other by screws. The sub-assemblies are divided into a back plate 12, two side plates 13, a top plate 11 and a bottom plate 15. The four sides of the back plate 12 are provided with flangings 14 which are provided with a combined connecting hole 3. A flap 16 (shown in FIG. 6) perpendicular to the side plate 13 is formed at the vertical edge of the side plate 13, and the edge of the flap 16 is provided with a flanging 14 which is parallel to the side plate 13. The flanging 14 is provided with a threaded connecting hole 5, and the upper and lower transverse edges of the side plate 13 are provided with a flanging 14 which is provided with a combined connecting hole 3. The top plate 11 is provided with a flap 16 which is perpendicular to the top plate 11 at a position corresponding to the back plate 12 and the side plate 13. The edge of the flap 16 is provided with a flanging 14 parallel to the top plate 11 and the flanging 14 is provided with a threaded connecting hole 5. The bottom plate 15 is provided with a flap 16 which is perpendicular to the bottom plate 15 at the position corresponding to the back plate 12 and the side plate 13. The edge of the flap 16 is provided with a flanging 14 parallel to the bottom plate 15 and the flanging 14 is provided with a threaded connecting hole 5. The slide slot 9 of the combined connecting hole 3 in the vertical flanging 14 of the back plate 12 is below the insertion hole 8. The combined connecting hole 3 in the flanging 14 above the side plate 13 on the left side, the combined connecting hole 3 in the flanging 14 above the back plate 12, and the combined connecting hole 3 in the flanging 14 above the side plate 13 on the right side, all slide slots 9 of these combined connecting holes 3 are directed in one direction with respect to the insertion hole 8. Likewise, all the slide slots 9 of the combined connecting holes 3 in the lower flangings 14 are also directed in one direction with respect to the insertion holes 8. The threaded connecting hole 5 and the combined connecting hole 3 in the flanging 14 are in a one-to-one correspondence, and after the screw connection, the end position of the slide slot 9 is aligned with the threaded connecting hole 5, and the structures of the threaded connecting hole 5 and the combined connecting hole 3 are shown as the structures in FIGS. 1-4.

Screws are preloaded in all of the threaded connecting holes 5 in the vertical flanging 14 of the side plate 13. A sufficient clearance is provided between the screw cap and the surface of the flanging 14, and then the side plate 13 is aligned with the vertical flanging 14 of the back plate 12 and the screw cap is inserted into the insertion hole 8, and then the side edge 13 is moved downwardly so that the threaded section of the screw enters into the slide slot 9 to complete the assembly of the side plate 13 and the back plate 12 (see FIG. 6). Both sides of the side plates 13 are assembled with the back plate 12, and then the screws are preloaded in the threaded connecting holes 5 in the flanging 14 of the top plate 11, leaving a sufficient clearance as the same, and the flanging 14 of the top plate 11 are overlapped with the upper flangings 14 of the back plate 12 and the side plate 13. The screw cap is inserted into the insertion hole 8, and then the top plate 11 is moved in the direction toward the slide slot 9 so that the threaded section of the screw enters into the slide slot 9 to complete the assembly of the top plate 11. In the same way, the assembly of the bottom plate 15 is completed, such that the assembly of the cabinet is completed. Then, the cabinet door 10 is mounted on both side plates 13, and the cabinet door 10 and the side plate 13 are connected by hinges.

Figure 14:
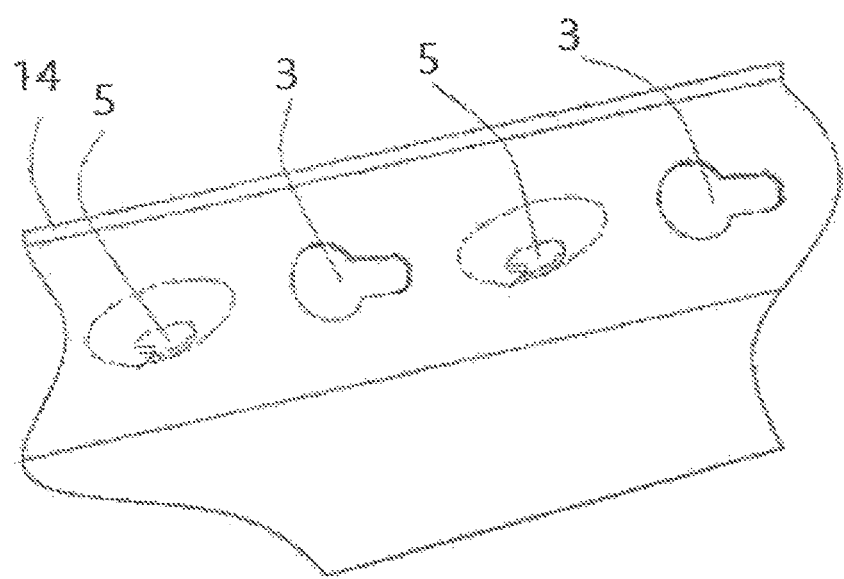
FIG. 14 is a structural schematic diagram of a connecting member with threaded connecting holes and connecting holes which are staggered.

Alternatively, as shown in FIG. 14, the threaded connecting holes 5 and the combined connecting holes 3 in the flangings contacting with each other may be staggered with each other as long as the slide slots 9 in the combined connecting holes 3 are in the same direction with respect to the insertion hole 8.

Example 2

In the connecting structure of the present embodiment, the edge of the threaded connecting hole is provided with a convex surface provided with an axial connecting portion at a radial position of the convex surface, and the axial connecting portion forms a height difference of one pitch at the periphery of the threaded connecting hole, and the side edge of the axial connecting portion facing the center of the threaded connecting hole is provided with a groove matching with the form of the thread of the screw. The screw is screwed into the threaded connecting hole, and the crest of the thread is right at the bottom of the groove. The remaining structure is referred to as in Example 1.

Example 3

Figure 7:
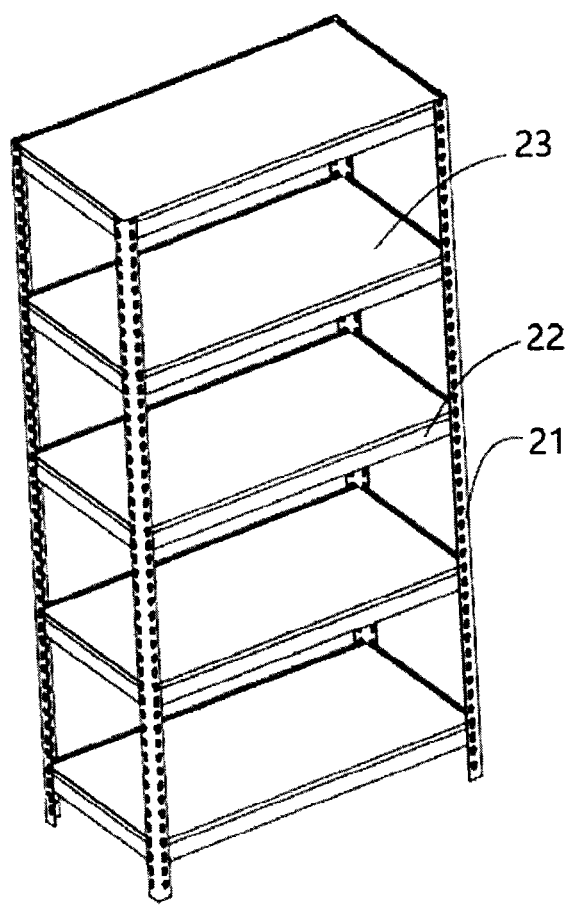
FIG. 7 is a schematic diagram of a storage rack containing the connecting structure according to the invention.
Figure 8:
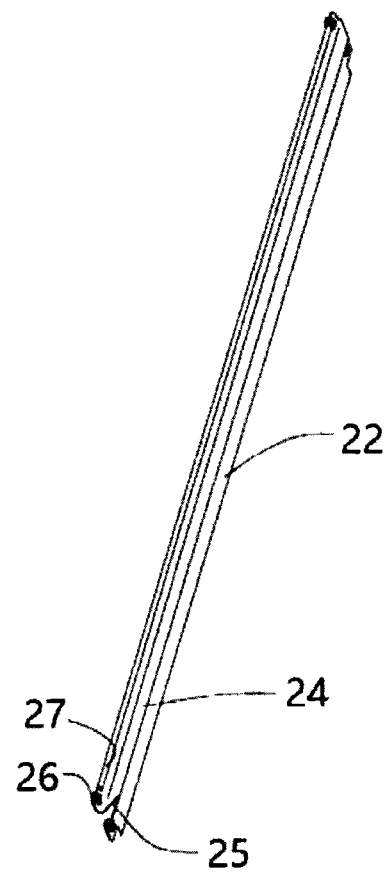
FIG. 8 is a schematic cross-sectional view of a beam.
Figure 9:
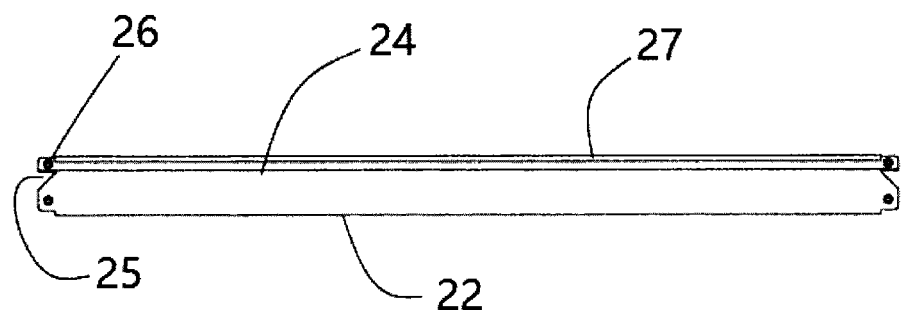
FIG. 9 is a front view of a beam.

FIG. 7 shows a storage rack containing a connecting structure according to the invention, including columns 21, beams 22 and shelf plates 23. The number of columns 21 is four, the two ends of the beams 22 are connected to the columns 21, and the four beams 22 form a storey, and the shelf plates 23 are placed on the beams 22 on each storey. A storage rack has multiple storeys as needed, and the distances between storeys are variable.

Figure 12:
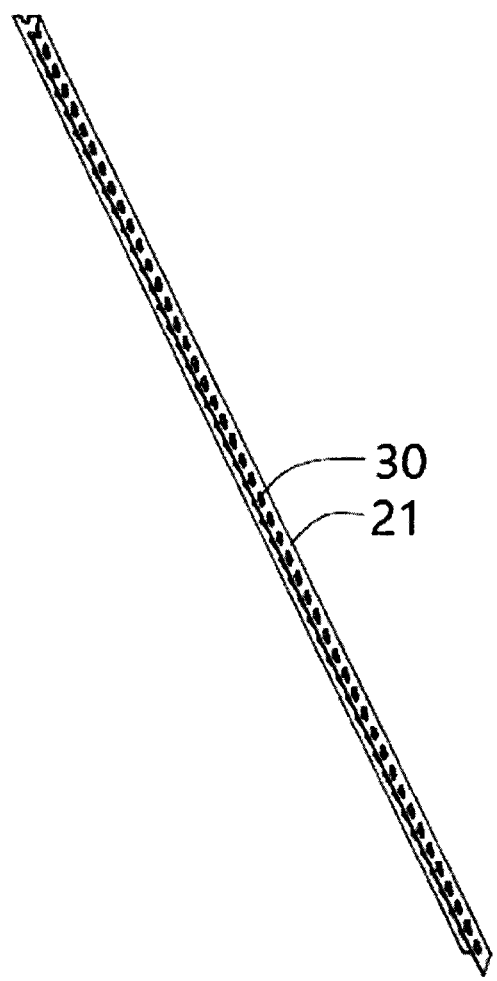
FIG. 12 is a schematic perspective view of a column.
Figure 13:
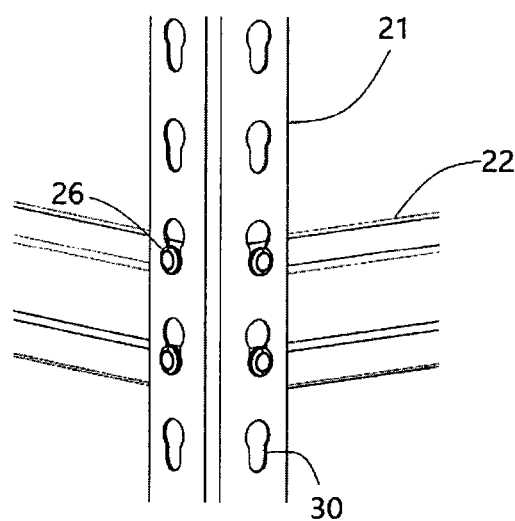
FIG. 13 is a structural schematic diagram of a joint between a column and a beam.

The two ends of the beams 22 are respectively fixed with two rivets 26 (see FIGS. 8-10 and 13) as the connecting elements of the columns 21, and the two rivets 26 at a same end are arranged in an up-and-down structure with a clearance between the surface of the rivet head and the surface of the beam 22, and the clearance is the thickness of the plate of the column. The beams 22 are connected to the columns 21 by means of snapping the rivets 26 into the snap holes 30. The column 21 includes two right-angled planes in which a plurality of snap holes 30 are provided (see FIGS. 12 and 13), and the snap holes 30 are formed by a combination of a large circular hole and a small circular hole that communicate with each other. The distances between the snap holes 30 in a same column 21 are uniform. The distance between the centers of the two vertically adjacent small circular holes is the distance between the centers of the two rivet heads at the same end of the beam 22. The diameter of the large circular hole is larger than that of the rivet head, and the diameter of the small circular hole is ranged between the diameter of the rivet head and the diameter of the rivet rod, or preferably the diameter of the small circular hole is equal to the diameter of the rivet rod.

In another embodiment, the connecting element may be other snappable ways other than rivets, such as a hook or the like, or a connecting structure as described in Embodiments 1 and 2. When the connecting structure described in the first embodiment is used, both ends of the beam 22 are each provided with two threaded connecting holes 5 arranged in an up-down structure, or two combined connecting holes 3, or a threaded connecting hole 5 and a combined connecting hole 3. In contrast, the corresponding positions of the columns 21 are provided with two combined connecting holes 3, or two threaded connecting holes 5, or a combined connecting hole 3 and a threaded connecting hole 5. The screw (pertaining to one of the fasteners 1) is pre-screwed into the threaded connecting hole 5 so that the distance between the inner side plane of the screw head and the surface of the beam 22 or the column 21 is the thickness of the column 21 or the beam 22. The threaded connecting hole 5 and the combined connecting hole 3 are each in a one-to-one correspondence, and the end position of the slide slot 9 is aligned with the threaded connecting hole 5 after the screw is connected. The structures of the connecting hole 5 and the combined connecting hole 3 are shown as the structures in FIGS. 1-4.

After the beam 22 is connected to the column 21, the first reinforcing rib 24 is relatively opposed to the inner side, and the length of the beam 22 can be adjusted to change the length and width of the storage rack and the shelf plate 23 of different length and width can be used. The beams 22 of the same storey are connected to the snap holes 30 or the threaded connecting holes 5 or the combined connecting holes 3 at the same height in the column 21, and the distance between storeys can be changed by adjusting the height of the four beams 22 on the same storey of the column 21.

A first reinforcing rib 24 is arranged between the upper connecting element and the lower connecting element of the beam 22 in the longitudinal direction, and the first reinforcing rib 24 is preferably located in the middle position of the beam 22, so as to contribute to uniform force-bearing. The two ends of the first reinforcing rib 24 are inclined ends 25 and the inclination angles of the inclined ends 25 are not greater than 45 degrees, so that the interference between the ends of the beams 22 with the column 21 when connected can be avoided.

The first reinforcing rib 24 is composed of an oblique portion 29 and a transverse portion 28, and the upper surface of the transverse portion 28 is a support surface, and the shelf plate 23 is placed on the support surface. The transverse portion 28 is flat plate shaped and the support surface is a supportive plane. The oblique portion 29 is flat plate shaped, and the oblique portion 29 and the transverse portion 28 are provided with a rounded bent corner therebetween. The distance between the support surface of the first reinforcing rib 24 and the upper edge of the beam 22 is adapted to the thickness of the shelf plate 23, and the rivet head and the first reinforcing rib 24 are separately disposed on both sides of the main plane of the beam 22.

In another preferred embodiment, the first reinforcing rib is composed of two upper and lower oblique portions (see D in FIG. 11), and the slope of the lower oblique portion is greater than the slope of the upper oblique portion. The first reinforcing rib is upwardly tilted and the bent corner between the two oblique portions are used as the support corner for the shelf plates, and such structure is not prone to declination through deformation, where the angle α between the upper oblique portion and the main plane of the beam is between 60 and 85 degrees.

The transverse or oblique portions may be flat or arcuate, and the bend corners are preferably rounded.

Figure 10:
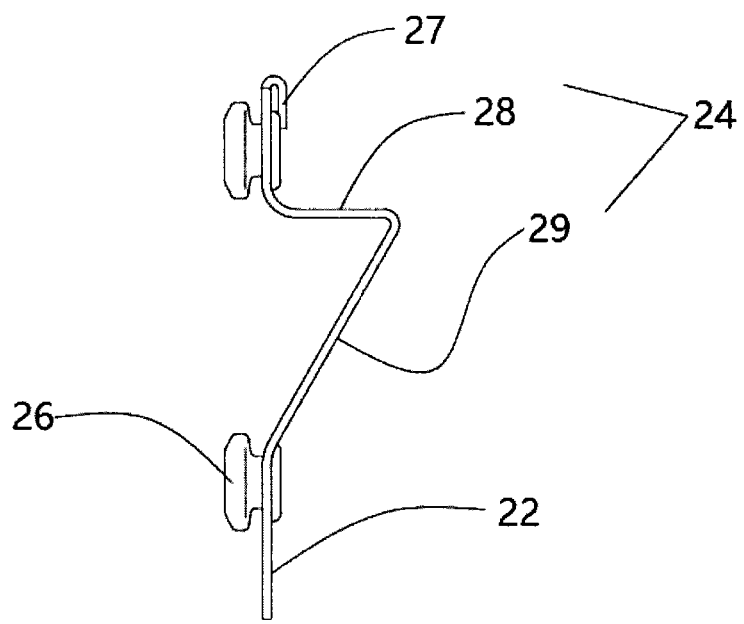
FIG. 10 is a side view of a beam.
Figure 11:
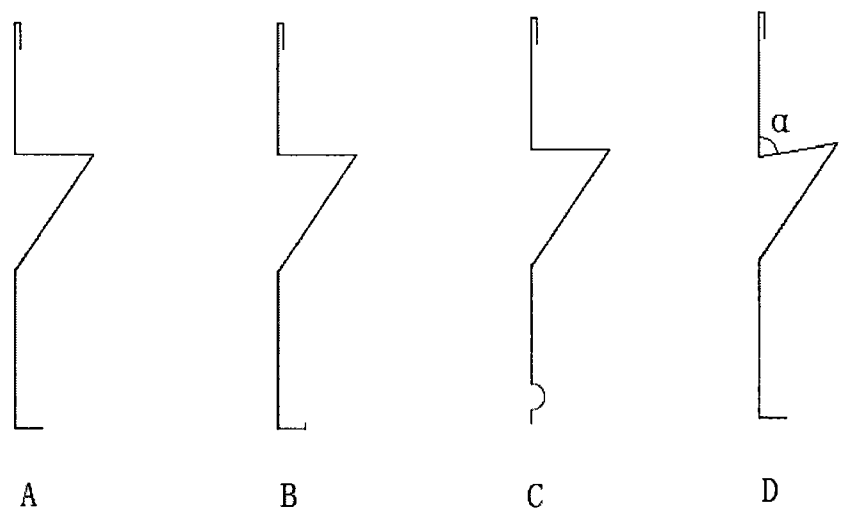
FIG. 11 is a sketch of the structure of the four optional beams as seen from the side.

As can be seen from FIG. 10, in the present embodiment, the upper side edge of the beam 22 has a second reinforcing rib 27 bent downward by 180 degrees, and the lower side edge of the beam 22 is a straight edge. However, A, B, and C in FIG. 11 show the other three preferred embodiments of the lower side edge of the beam, and the lower side of edge A has a third reinforcing rib bent by 90 degrees; the lower side edge of the B has a fourth reinforcing rib bend upward by 90 degrees at the edge in addition to being bent by 90 degrees; the lower side edge of the C has an arched rib as the fifth reinforcing rib.

The preferred specific embodiments of the invention have been described in detail above. It is to be understood that numerous modifications and variations can be made by those ordinary skilled in the art in accordance with the concepts of the present invention without any inventive effort. Hence, the technical solutions that may be derived by those skilled in the art according to the concepts of the present invention on the basis of the prior art through logical analysis, reasoning and limited experiments should be within the scope of protection defined by the claims.

The invention claimed is:

1. An article containing a plurality of connecting structures, each connecting structure comprising a fastener, a first connecting portion of a first plate adjacent to a trailing end of the fastener and a second connecting portion of a second plate away from the trailing end of the fastener, wherein the second connecting portion is provided with a threaded connecting hole, and the threaded connecting hole in the axial direction thereof is provided with thread matching with the form of a threaded segment of the fastener and having a central angle of at least 180 degrees; the first connecting portion is provided with a connecting hole; the fastener connects the two connecting portions through the threaded connecting hole and the connecting hole; and the thickness of the threaded connecting hole is equal to one pitch of the fastener;

wherein the second connecting portion is provided with a convex surface in the direction away from the first connecting portion, and the threaded connecting hole is provided in the convex surface so that the convex surface is separated from the first connecting portion when the second connecting portion is overlapped and fastened with the first connecting portion;

wherein the connecting hole is a combined connecting hole, comprising an insertion hole and a slide slot communicating with the insertion hole, the diameter of the insertion hole being greater than the diameter of the trailing end of the fastener, the width of the slide slot being adapted to be fitted with the diameter of the threaded segment of the fastener;

wherein the article is a cabinet comprising a cabinet body and a cabinet door which are hinged to each other and the cabinet body is formed by a plurality of sub-assemblies that are connected to each other by one of the plurality of connecting structures;

wherein the edge of each sub-assembly where the sub-assemblies are butted is provided with a flanging provided with a respective one of the threaded connecting hole and the combined connecting hole formed by the insertion hole communicating with the slide slot; and after two of the flangings are butted, the fastener connects the slide slot and the threaded connecting hole;

wherein the sub-assemblies comprise a back plate, a pair of side plates, a top plate and a bottom plate, four sides of the back plate each provided with a flanging; a flap perpendicular to the side plate is formed at the vertical edge of each respective side plate, and the edge of the flap is provided with a flanging, the flanging of the flap being parallel to the side plate; a top flap perpendicular to the top plate is formed at the transverse edge of the top plate, the edge of the top flap provided with a flanging, the flanging of the top flap being parallel to the top plate; a bottom flap perpendicular to the bottom plate is formed at the transverse edge of the bottom plate, the edge of the bottom flap provided with a flanging, the flanging of the bottom flap being parallel to the bottom plate; and wherein each of the flanging of each of the side plates, the flanging of the top flap and the flanging of the bottom flap is provided with one of the threaded connecting hole and the combined connecting hole, and the flanging of each of the four sides of the back plate is provided with the other of the threaded connecting hole and the combined connecting hole; the flanging of each of the side plates, the flanging of the top flap and the flanging of the bottom flap being respectively butted with the corresponding flanging of each of the four sides of the back plate and then the fasteners connecting the side plates, the top plate and the bottom plate to the back plate through connecting the threaded hole and the combined connecting hole.

2. The article as claimed in claim 1, wherein the center angle of the thread in the axial direction of the threaded connecting hole is at most 360 degrees.

3. The article as claimed in claim 1, wherein the edge of the threaded connecting hole is provided with an open slot in the radial direction, and both sides of the open slot are offset from each other to form a height difference of one pitch, the position of the open slot corresponding exactly to the start and end positions of the thread of the threaded connecting hole.

4. The article as claimed in claim 1, wherein the edge of the threaded connecting hole is provided with an axial connecting portion in the radial direction, the axial connecting portion forming a height difference of one pitch at the periphery of the threaded connecting hole, a side edge of the axial connecting portion facing the center of the threaded connecting hole being provided with a groove matching with the form of the thread of the fastener.

\* \* \* \* \*